US006260831B1

United States Patent
Jäger

(10) Patent No.: US 6,260,831 B1
(45) Date of Patent: Jul. 17, 2001

(54) APPARATUS FOR AERATING WATER WITH FINE BUBBLES

(76) Inventor: Arnold Jäger, Gehrbergsweg 6, D-31303, Burgdorf (DE)

(*) Notice: Subject to any disclaimer, the term of this patent is extended or adjusted under 35 U.S.C. 154(b) by 0 days.

(21) Appl. No.: 09/620,342

(22) Filed: Jul. 20, 2000

(30) Foreign Application Priority Data

Jul. 24, 1999 (DE) ................................. 199 34 890

(51) Int. Cl.⁷ ........................ C10J 1/08; C02F 11/06
(52) U.S. Cl. ............ 261/122.1; 261/124; 261/DIG. 47; 210/242.2; 119/215
(58) Field of Search ........................... 261/124, DIG. 47, 261/122.1; 210/242.2; 119/215

(56) References Cited

U.S. PATENT DOCUMENTS 3,642,260 * 2/1972 Danjes .
5,587,114 * 12/1996 Tharp .
5,690,864 * 11/1997 Tyer .
6,050,550 * 4/2000 Burgess .

* cited by examiner

Primary Examiner—Chester T. Barry
(74) Attorney, Agent, or Firm—Robert W. Becker & Associates

(57) ABSTRACT

An apparatus for aerating water with fine bubbles using elastomeric members having fine openings is provided. The apparatus is provided with one or more lifting bodies in such a way that the apparatus, which is generally disposed at the base of a reservoir or tank, can be raised, by introducing air into the lifting bodies, to such an extent that the apparatus is accessible above the surface of the water.

18 Claims, 2 Drawing Sheets

APPARATUS FOR AERATING WATER WITH FINE BUBBLES

BACKGROUND OF THE INVENTION

The present invention relates to an apparatus for aerating water with fine bubbles, and includes aerating elements that are supplied by one or more preferably rigid feed lines with compressed air; the aeration elements have disk or plate-like and/or tube-like elastomeric bodies that are finely pored or have fine slits.

Such apparatus, which are generally secured to the base of the reservoir or tank that is to be aerated, are subjected not only to wear, but also to becoming contaminated or otherwise having their ability to function adversely affected. Accordingly, the reservoir must be emptied in order to provide access to the apparatus. It is to be understood that the measures required to accomplish this take a lot of time and put the apparatus out of operation.

It is therefore an object of the present invention to eliminate these drawbacks. In addition, handling of the apparatus should accordingly be significantly simplified, and should be possible without having to empty the reservoir or tank.

BRIEF DESCRIPTION OF THE DRAWING

These and other objects and advantages of the present invention will appear more clearly from the following specification in conjunction with the accompanying schematic drawing, in which.

SUMMARY OF THE INVENTION

Figure 1:
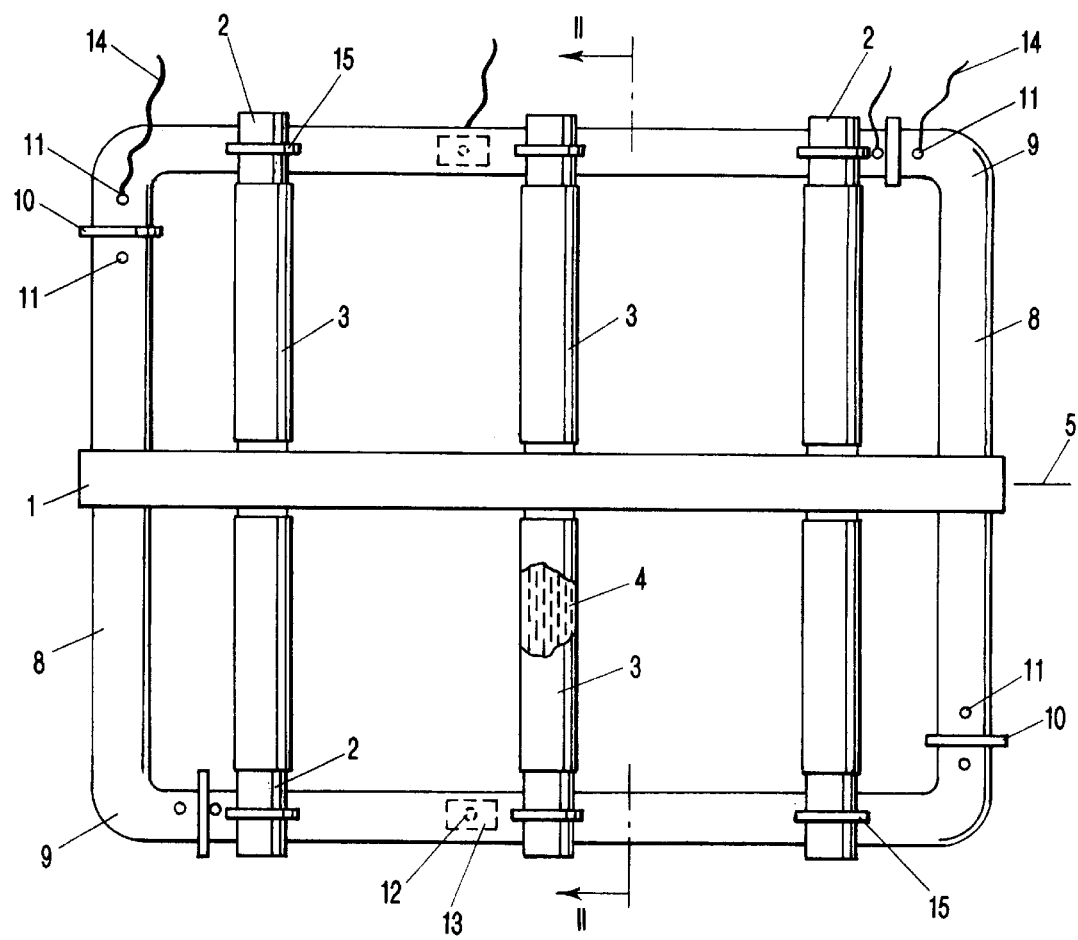
FIG. 1 is a top view of one exemplary embodiment of the inventive apparatus for aerating water with fine bubbles, along with lifting bodies.

The apparatus of the present invention is characterized primarily in that the aeration elements, and/or the preferably rigid feed lines thereof, are provided with one or more container-like lifting bodies that in the operative position of the apparatus are flooded entirely or partially and are provided with one or more connections for the introduction of compressed air in such a manner that via introduction of air the apparatus can be raised in the water to such an extent that the apparatus, or at least the aeration elements thereof, are accessible above the surface of the water.

Accordingly, the inventive concept is to dispense with a rigid anchoring of the aeration elements on the base of the reservoir or the like, and to embody the apparatus in such a way that it can be raised using lifting bodies, which can be filled at will with compressed air in order to displace the water with which they were filled. Pursuant to the inventive concept, apparatus of the aforementioned type can now also be utilized in lakes or ponds since they can be lowered at any desired location and can again be floated.

The aeration elements and preferably also their feed lines are mounted on the top of the lifting bodies in order to ensure that when the lifting bodies are floating the aeration elements will be disposed above the surface of the water. The lifting bodies should expediently also be embodied in such a way that they can form a floating body that will not tip. For this purpose, it is also advantageous if the lifting bodies form a frame, or are mounted on a rigid frame, upon which the feed lines and the aeration elements are to be installed. A particularly advantageous arrangement is provided if the lifting bodies are tubes that then at the same time ensure the strength or rigidity of the frame.

Lifting bodies that are divided into chambers are expediently used that are to be respectively provided with pressurizing and venting connections. In this connection, it is advantageous for elongated lifting bodies to have venting openings at the ends of the lifting bodies in order to preclude tipping and tilting of the lifting bodies when they are immersed.

Further specific features of the present invention will be described in detail subsequently.

DESCRIPTION OF PREFERRED EMBODIMENTS

Referring now to the drawing in detail, the aeration apparatus itself essentially comprises a rigid feed line in the form of a pipe 1 to the underside of which are secured a plurality of support pipes 2 that extend parallel to one another. These support pipes 2 extend on both sides of and transverse to the pipe 1, and are provided with respective tubular coverings 3 that rest closely against them; the coverings 3 are made of rubber or some other elastomeric material and are provided with a plurality of apertures or fine slits 4. The coverings 3 are prevented from being displaced on the support pipes 2 by means of clamps or the like.

Compressed air is supplied to the pipe 1 in the direction of the arrow 5. From there, the air passes in the direction of the arrows 6 into the support pipes 2, and finally beneath the coverings 3, where the air effects an opening of the fine slits 4 and enters the water W in the direction of the arrows 7 as fine bubbles. If air is no longer supplied to the coverings 3 from within, the fine slits 4 close.

Air can be supplied to the coverings 3 in any desired manner. It is furthermore to be understood that the support pipes 2 can be internally filled with water by known measures in order to reduce the lifting forces or buoyancy of the aeration apparatus.

The inventive aeration apparatus is connected to one or more lifting bodies.

Figure 2:
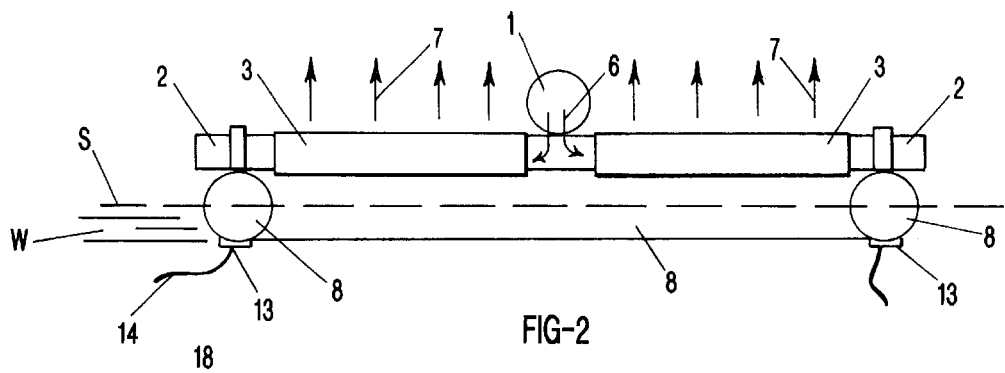
FIG. 2 is a cross-sectional view taken along the line II—II in FIG. 1.
Figure 3:
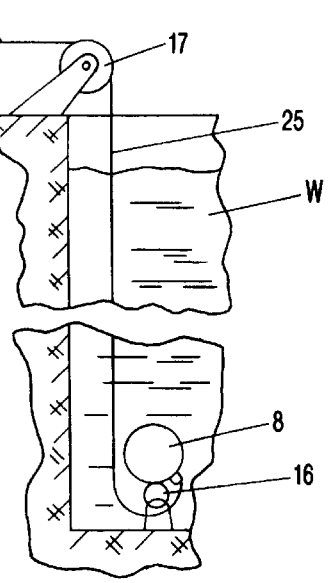
FIG. 3 is a partial vertical cross-sectional view through the edge of a water reservoir that is to be aerated.

In the embodiment illustrated in FIGS. 1 and 2, a rigid frame is provided that comprises four elements, and in particular four tubular sections 8 having curved sections or elbows 9. These elements are fixedly interconnected by flanges 10 in order to thus form the desired rigid frame. At the same time, four chambers or cells are formed. In order to be able to supply them with compressed air, or to be able to vent or flood them, each element is provided in the region of each of its ends, on the upperside, with a respective connection 11, and furthermore with a connection 12 via a connection box 13. Flexible lines 14 are associated with these connections for being able to supply or withdraw the air. It is to be understood that the lifting bodies can be controlled in any suitable manner by the lines 14. However, in this connection the important thing is that venting possibilities in the form of the connections 11 are disposed at the ends of the elements 8, 9 in order to be able to achieve a uniform venting and to preclude tilting or tipping movements of the lifting bodies due to air cushions that remain in the end region of the elements.

From FIGS. 1 and 2 it can be seen that the ends of the support pipes 2 rest upon the lifting bodies, i.e. the tubular sections 8 thereof. The support pipes 2 are secured at these locations by clamps 15. The pipe 1 in turn is secured to the tops of the support pipes 2.

With the lifting bodies flooded, the water aeration can be accomplished in a known manner. However, if it is necessary to inspect, repair, provide replacements, or the like for the aeration apparatus, compressed air is introduced into the lifting bodies. In the end position, the floating position, which is indicated in FIG. 2 by the water surface S, all of the components of the aeration apparatus are disposed above the water surface S. Thus, any desired work can be accomplished without having to lower the water level or even having to empty the water reservoir or tank.

In order to be able to bring the aeration apparatus into its operating position, the lifting bodies are vented, in other words, the pressure is released therefrom. In the operating position, the lifting bodies can then be secured in place, and in particular, for example, by means of a holding cable 25 that at the base of the reservoir is guided through an eye 16, and at the top is guided over a roller 17. Via a pulling action in the direction of the arrow 18, the aeration apparatus can be fixed at the base of the reservoir. It is to be understood that a rising or surfacing of the aeration apparatus is not prevented by the holding cable 25 if the cable can move or yield.

Figure 4:
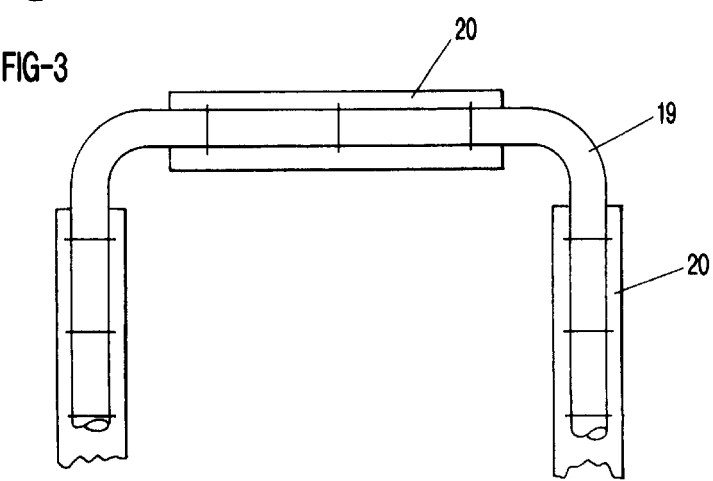
FIG. 4 is a partial top view of a modified embodiment of an inventive lifting body.

For reasons of stabilization, the aeration apparatus should be disposed on a lifting body, or on a frame or the like that supports the lifting body, that has an adequate strength and in particular rigidity. Accordingly, for example pursuant to the embodiment illustrated in FIG. 4, a rigid support body can be used as the frame 19, to which a plurality of lifting bodies 20 must be associated. These lifting bodies can be embodied as inflatable bodies that are made of rubber or the like.

It should be noted that with the embodiment of FIGS. 1 and 2, counterweights might be necessary in order to achieve an adequate negative buoyancy when the apparatus is to sink. In this connection, the counterweights should be of such a magnitude that in a floating state the required buoyancy is still just provided. This can then be reduced or neutralized by flooding. In the embodiment illustrated in FIG. 4, in contrast, if the inflatable bodies 20 are not inflated, the apparatus must be heavier than the water volume so that it can rest upon the bottom of the reservoir or tank. Buoyancy is then achieved by introducing the air into the inflatable bodies.

It has furthermore been shown to be advantageous to join the connections 11 of each chamber of the lifting bodies together in order in this manner to achieve a common aeration or venting line.

The specification incorporates by reference the disclosure of German priority document 199 34 890.1 of Jul. 24, 1999.

The present invention is, of course, in no way restricted to the specific disclosure of the specification and drawing, but also encompasses any modifications within the scope of the appended claims.

What I claim is:

1. An apparatus for aerating water with fine bubbles, comprising:

feed means;

at least one aeration element that is in flow communication with said feed means and is provided with an elastomeric body that is finely pored or has fine slits; and at least one container-like lifting body for at least one of said feed means and said at least one aeration element, wherein in an operative position of said apparatus said at least one lifting body is at least partially flooded, and wherein said at least one lifting body is provided with at least one connection for the introduction of air such that with an introduction of air into said at least one lifting body said apparatus can be raised in water to such an extent that at least said at least one aeration element of said apparatus is accessible above the surface of said water.

2. An apparatus according to claim 1, wherein said at least one lifting body is a rigid element for supporting said at least one aeration element.

3. An apparatus according to claim 2, wherein said at least one rigid element forms a closed frame.

4. An apparatus according to claim 3, wherein said frame is divided into two or more chambers or cells, each of which is provided with ones of said connections.

5. An apparatus according to claim 1, wherein said elastomeric body is disposed on a support pipe of said at least one aeration element, wherein ends of said support pipe are supported on said at least one lifting body.

6. An apparatus according to claim 5, wherein said feed means is a feed line for said elastomeric body of said support pipe.

7. An apparatus according to claim 6, wherein said feed line is disposed centrally above said support pipe, and wherein said feed line is disposed perpendicular to said support pipe.

8. An apparatus according to claim 6, wherein said feed line is a rigid feed line.

9. An apparatus according to claim 1, wherein opposite ends of said at least one lifting body are provided with ones of said connections in the form of apertures or venting openings.

10. An apparatus according to claim 1, wherein detachable anchoring means for securing said operative position of said apparatus are associated with said at least one lifting body.

11. An apparatus according to claim 10, wherein said anchoring means includes a cable for holding said at least one lifting body, and also includes an eye through which said cable is guided, wherein an upper end of said cable, above said surface of said water, is detachably held.

12. An apparatus according to claim 11, wherein said eye is anchored at the base of a water container.

13. An apparatus according to claim 3, wherein said frame comprises four linear tubular sections that are interconnected at their ends by respective elbows.

14. An apparatus according to claim 1, wherein said at least one lifting body is adapted to receive counterweights.

15. An apparatus according to claim 4, wherein said connections of each of said chambers is guided to a common pressurizing and venting line.

16. An apparatus according to claim 1, which includes a support frame which is supported by said at least one lifting body and is comprised of rigid elements for supporting said at least one aeration element.

17. An apparatus according to claim 16, wherein said rigid elements form a closed frame.

18. An apparatus according to claim 16, wherein said at least one lifting body is an inflatable body that is made of elastomeric material.

* * * * *